(12) United States Patent
Strassle

(10) Patent No.: US 6,185,887 B1
(45) Date of Patent: Feb. 13, 2001

(54) SHAPED BAR AND CLAMPING SECTION FOR A SHAPED BAR

(75) Inventor: Marcel Strassle, Kirchberg (CH)

(73) Assignee: SYMA Intercontinental AG, Kirchberg (CH)

(*) Notice: Under 35 U.S.C. 154(b), the term of this patent shall be extended for 0 days.

(21) Appl. No.: 09/171,943

(22) PCT Filed: Mar. 21, 1997

(86) PCT No.: PCT/CH97/00117
§ 371 Date: Feb. 17, 1999
§ 102(e) Date: Feb. 17, 1999

(87) PCT Pub. No.: WO97/41319
PCT Pub. Date: Nov. 6, 1997

(30) Foreign Application Priority Data

Apr. 29, 1996 (CH) .................................................. 1074/96
Nov. 13, 1996 (CH) .................................................. 2819/96

(51) Int. Cl.[7] ........................................................ E04B 2/74
(52) U.S. Cl. ........................ 52/282.2; 52/284; 403/387; 403/405.1; 403/231
(58) Field of Search ................................. 52/282.2, 284, 52/281, 282.1, 282.4, 238.1, 239, 720.1; 160/135, 351; 403/294, 387, 397, 405.1, 231

(56) References Cited

U.S. PATENT DOCUMENTS

| 3,193,885 | 7/1965 | Gartner et al. . |
| 3,782,048 | * 1/1974 | Corman ................................ 52/282.2 |
| 4,101,231 | * 7/1978 | Strieb .................................. 52/282.2 |
| 4,689,930 | 9/1987 | Menchetti . |
| 5,067,294 | * 11/1991 | McGowan ....................... 52/282.2 X |
| 5,864,997 | * 2/1999 | Kelly .................................... 52/282.2 |
| 5,960,599 | * 10/1999 | Schmidt et al. ..................... 52/282.2 |

FOREIGN PATENT DOCUMENTS

| 663 351 | 9/1965 | (BE) . |
| 415 999 | 5/1964 | (CH) . |
| 324654 | 11/1974 | (DE) . |
| 2739364 | * 3/1979 | (DE) .................................. 52/282.2 |
| 144 030 | 6/1985 | (EP) . |
| 180672 | 4/1984 | (HU) . |
| 207 767 | 5/1993 | (HU) . |
| 211 114 | 10/1995 | (HU) . |
| 213 772 | 10/1997 | (HU) . |

* cited by examiner

Primary Examiner—Richard Chilcot
(74) Attorney, Agent, or Firm—Sughrue, Mion, Zinn, Macpeak & Seas PLLC

(57) ABSTRACT

The profiled beam 111 is provided with a circular inner tubular part and comprises eight long slots, three of which are covered with each a clamping profile 112, 113, 114. At the supporting side, a supporting element 115 and two flat bars 116, 117 are fixed, which are provided with slots for further clamping profiles. The edges of the clamping profiles serve for the supporting of plates. A supporting surface 118 is attached laterally to the supporting element 115. The supporting element 115, which is oriented parallel to the flat bar 116, can also be mounted at the place of or additionally to this flat bar in parallel orientation to the flat bar 117, which shows the versatile applicability of the profiled beam.

13 Claims, 10 Drawing Sheets

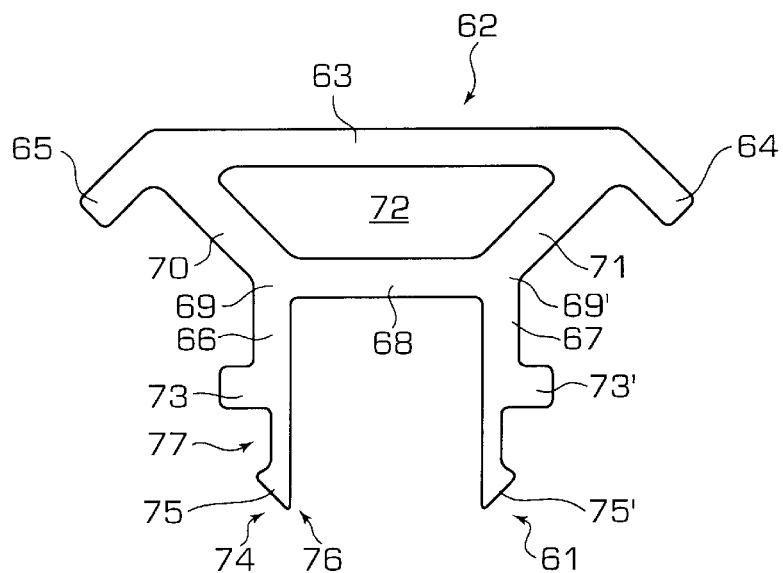
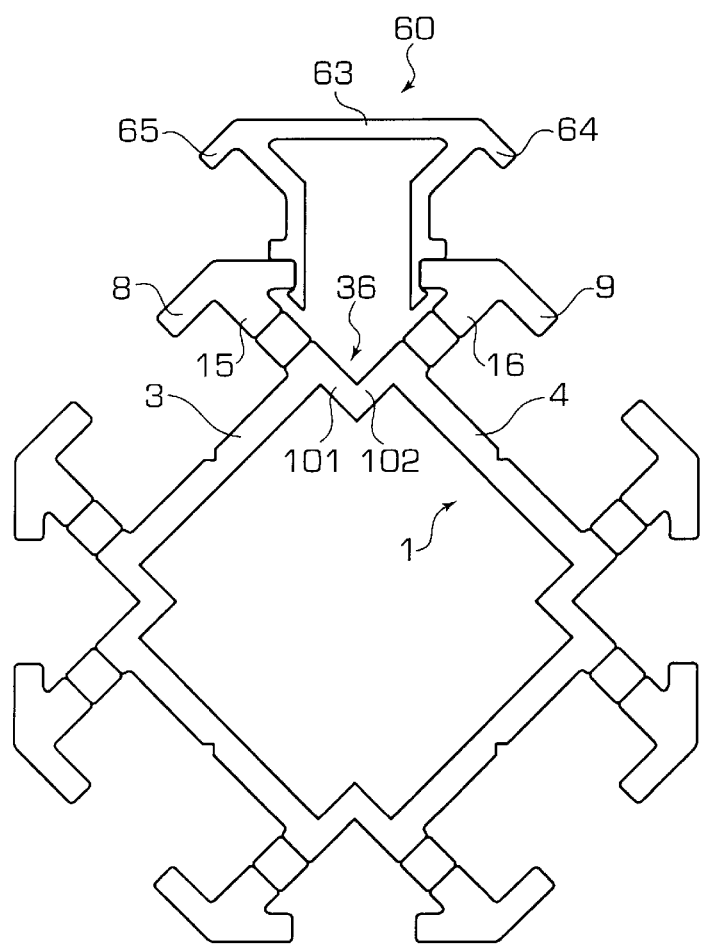

SHAPED BAR AND CLAMPING SECTION FOR A SHAPED BAR

BACKGROUND OF THE INVENTION

The present invention relates to a profiled beam, and further relates to a clamping profile for profiled beams.

From CH-415 999, a profiled beam is known, which is composed of a central circular ring and four equal arrows, which are radially staggered at 90° with respect to each other and directed with their tips outwards from the ring, whereby the beam comprises four long slots which are situated each between two tips.

SUMMARY OF THE INVENTION

It is the task of the invention to improve such a beam.

This task is solved, according to the invention, by means of a profiled beam having inner and outer tubes. The outer tube has at least two adjacent slots aligning in a longitudinal direction. Also the beam has a plurality of mounting slots for holding a clamping profile at a desired location.

Furthermore this task is solved, according to the invention, by means of a clamping profile having a substantially U-shaped portion. The U-shaped portion has two elongated walls extending from the base. Also at least one of the walls has a tapered edge.

The solution according to the invention results in a versatile support beam system, which allows a simple lateral mounting of walls.

Further advantageous embodiments of the invention are given in the claims.

BRIEF DESCRIPTION OF THE DRAWINGS

Exemplary embodiments of the invention are represented in the drawings, showing.

DETAILED DESCRIPTION OF THE PREFERRED EMBODIMENTS

Figure 1:
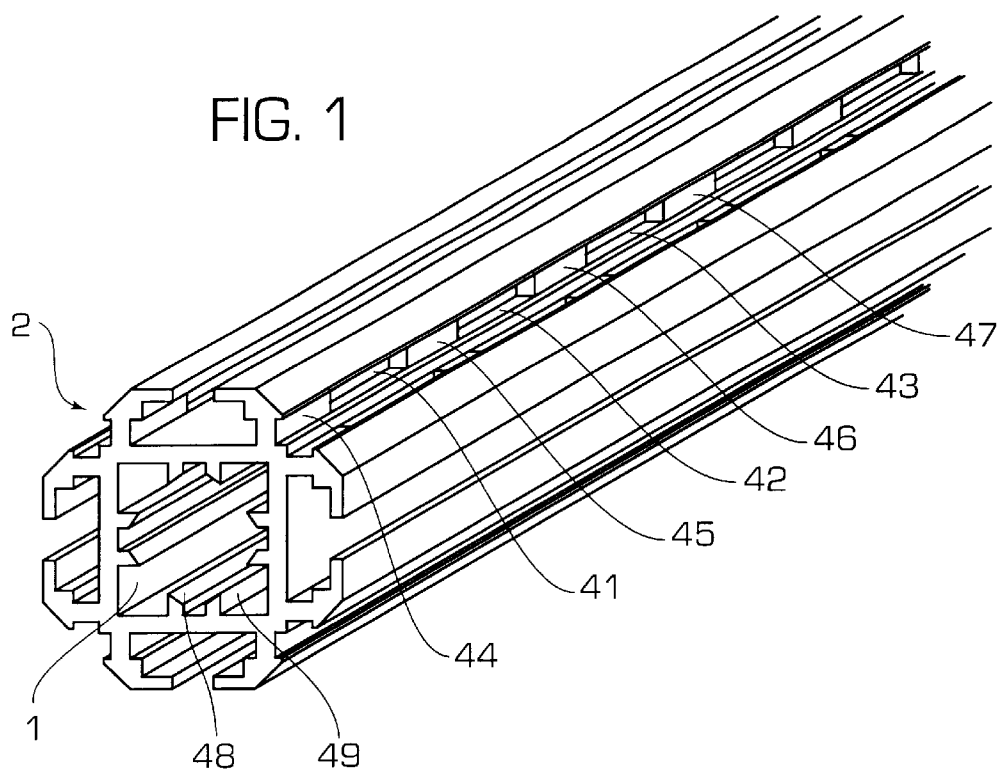
FIG. 1 a perspective view of a first embodiment of a beam profiled according to the invention, FIG. 2 a representation of the cross section of this beam, without inner ribs, FIG. 3 a perspective view of a further embodiment of a beam profiled according to the invention, FIG. 4 a perspective view of a supporting element which is separably clamped fast at such a beam, FIG. 5 a lateral view of a third embodiment of a beam profiled according to the invention, FIG. 6 a representation of the cross section of this beam, FIG. 7 a representation of the cross section of a clamping profile for these beams according to FIGS. 1, 3 or 5, according to the invention, FIG. 8 a schematic representation of a clamping profile which is separably clamped fast at a beam according to FIG. 5, FIGS. 9 to 11 examples of applications of the clamping profile and of the profiled beam according to the invention, FIG. 12 examples of cross sections of a beam according to further embodiments, FIG. 13 a perspective representation of a further embodiment of a clamping profile according to the invention, and FIGS. 14 and 15 further variants of the cross-section of a clamping profile according to the invention.
Figure 2:
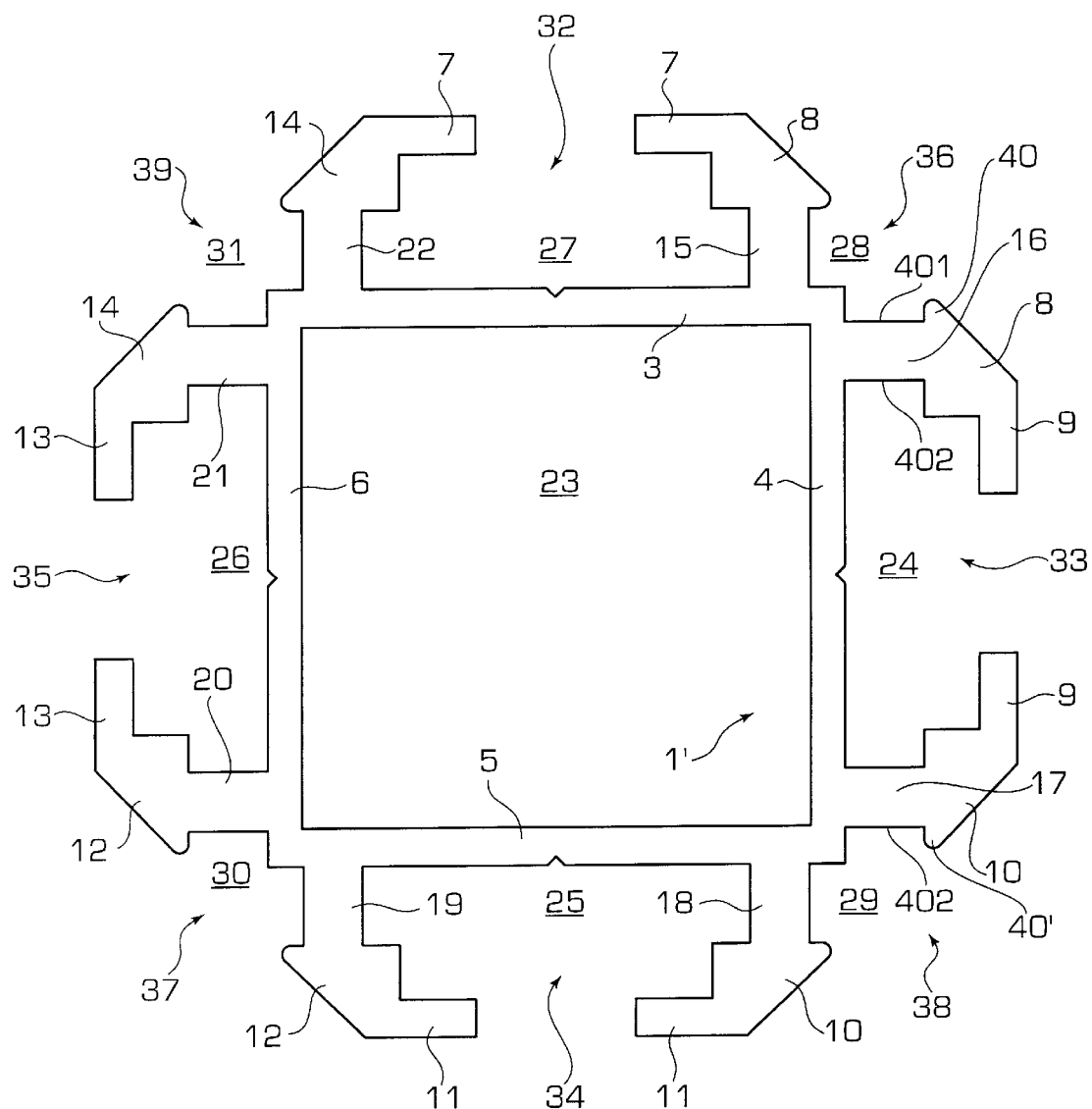

The profiled beams according to FIGS. 1 and 2 respectively are composed of an inner tubular part 1 or 1' with a quadratic cross section, which might, in its case, also be polygonal or circular, and an outer tubular part 2 with an octagonal cross section, which may also be polygonal or circular. The inner tubular part 1 or 1' (FIG. 2) comprises four relatively thin side walls 3, 4, 5, and 6. The outer tubular part 2 comprises eight relatively thin side walls 7 to 14. The tubular parts 1, respectively 1', and 2 are connected by eight elongated webs or ribs 15 to 22, which extend pair-wise outwards from the corner regions of a side wall of the inner tubular part 1, and namely each time orthogonal to this side wall. Each web 15 to 22 is connected to the junction part of two adjacent walls of the octagonal tubular part. Because the walls of the tubular parts 1, 1' and 2 and the thickness of the webs 15 to 22 are relatively thin in comparison to the height or width of the beam, nine hollow spaces result between the two tubular parts 1, 1' and 2. The largest hollow space 23 is situated at the interior of the inner tubular part 1, 1'. Four mean sized hollow spaces 24, 25, 26, 27 are situated between the walls of both tubular parts 1, 1' and 2 and the webs 16 and 17, respectively 18 and 19, respectively 20 and 21, respectively 22 and 15. The four smaller hollow spaces 28, 29, 30, and 31 are situated between the corners of the inner tubular part 1, 1', the walls of the outer tubular part 2 and the webs 15 and 16, respectively 17 and 18, respectively 19 and 20, respectively 21 and 22.

The four walls 7, 9, 11, and 13 of the outer tubular part 2 run therefore parallel to the four side walls 3, 4, 5, and 6, respectively, of the inner tubular part 1, 1', and are provided each with a centred long slot 32, 33, 34, and 35, which represent openings to the exterior world of the mean-sized hollow spaces 27, 24, 25, and 26, respectively.

Two further side walls 8 and 12 of the outer tubular part 2 run parallel to one diagonal of the cross section of the inner tubular part 1, 1' and are provided with each a centred long slot 36, 37, which represent openings of these two smaller hollow spaces 28, 30 to the exterior world. The two other side walls 10 and 14 of the outer tubular part 2 run parallel to the other diagonal of the cross section of the inner tubular part 1, 1' and are provided with each a centred long slot 38, 39, which represent openings of these two smaller hollow spaces 29, 31 to the exterior world. Because the four smaller hollow spaces 28, 29, 30, and 31 are relatively small, it results that the side walls 8, 10, 12, and 14 of the outer tubular part 2 are formed in part by relatively short elongated ribs 40, 40', . . . in the region of the long slots 36, 38, 37, and 39. The webs comprise on both sides a guide groove each, for example 401 and 402, respectively, which have identical width.

The webs 15 to 22 (FIG. 1) are provided with through-passing slots 41, 42, 43, . . . in the bottom of the grooves 401, 402, . . . , which are preferably situated in regular intervals between the web walls 44, 45, 46, respectively 47, . . . The width of the long slots 36, 37, 38, and 39, which communicate with the smaller hollow spaces, is sized as large as to allow a plate or a flat element to be inserted into one of these long slots, independently of if the plate is parallel to the one or to the other side wall of the inner tube. To this end, the outer edge or outer rib 40 of the outer side wall of a groove 401 may, for example, lie in the same plane of the outer surface of the side wall 3 of a inner tubular part 1, 1', or the distance between the remote outer edges 40 and 40' of the outer side walls of two grooves 402, 402' of two adjacent parallel webs, for example 16, 17, may be smaller than the width of the inner tubular part 1, 1' between the outer surfaces of the opposed side walls 3 and 5.

The inner tubular part 1 comprises, according to the embodiment shown in FIG. 1, eight inner guide ribs 48, 49, . . . , which comprise cylindrical front sides at their innermost end in a way that the guide ribs 48, 49, . . . can serve as guide for a cylindrical tube with a round cross section, and they are provided along the tubular part 1 preferably pair-wise in the middle of the inner side walls of said tubular part 1.

Figure 3:
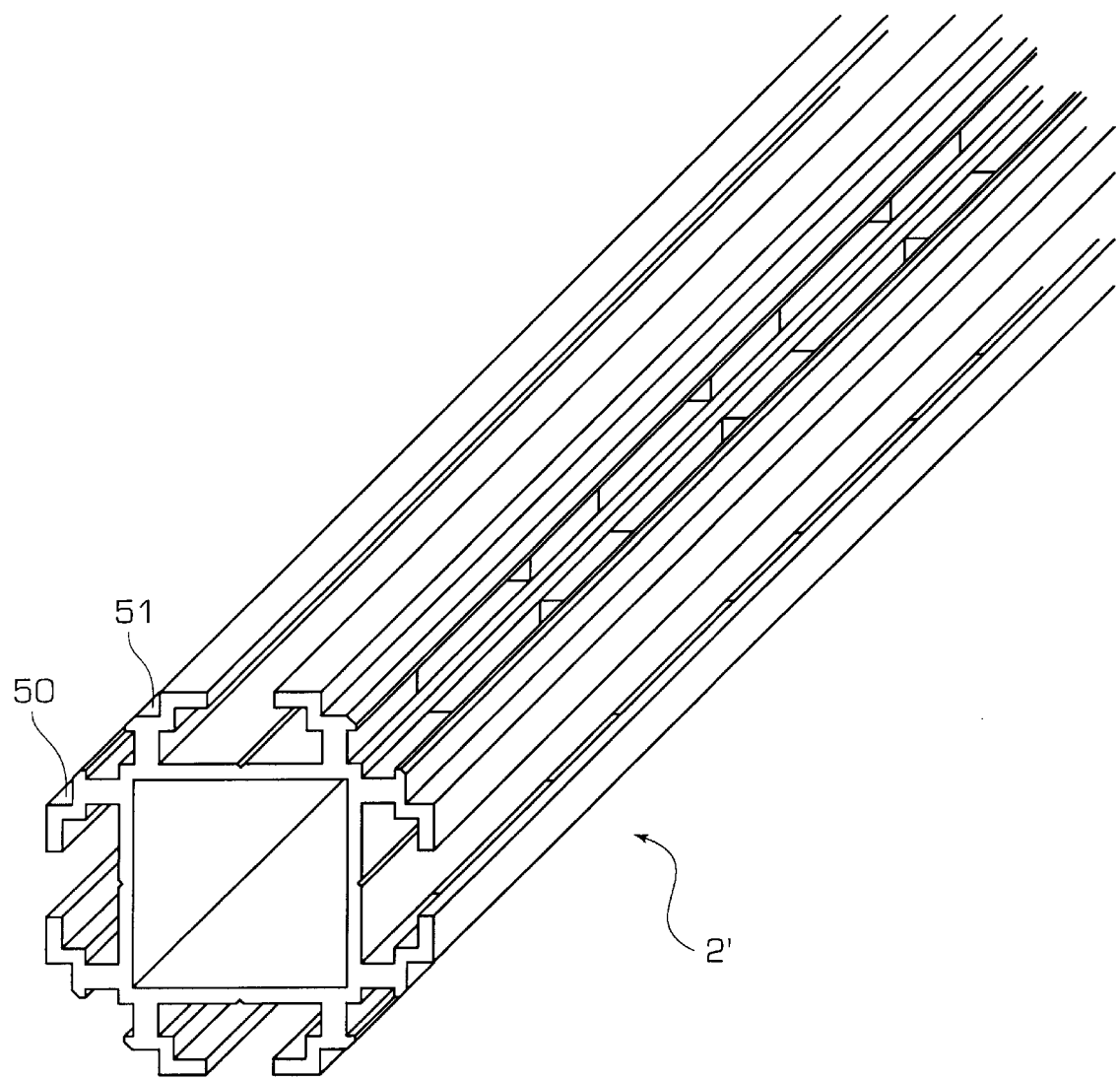

The outer tubular part 2' comprises, according to the embodiment shown in FIG. 3, eight grooves or recesses 50, 51 which act as shoulders and guides. Preferably, they comprise, as shown in FIG. 3, an angle of 90°.

Figure 4:
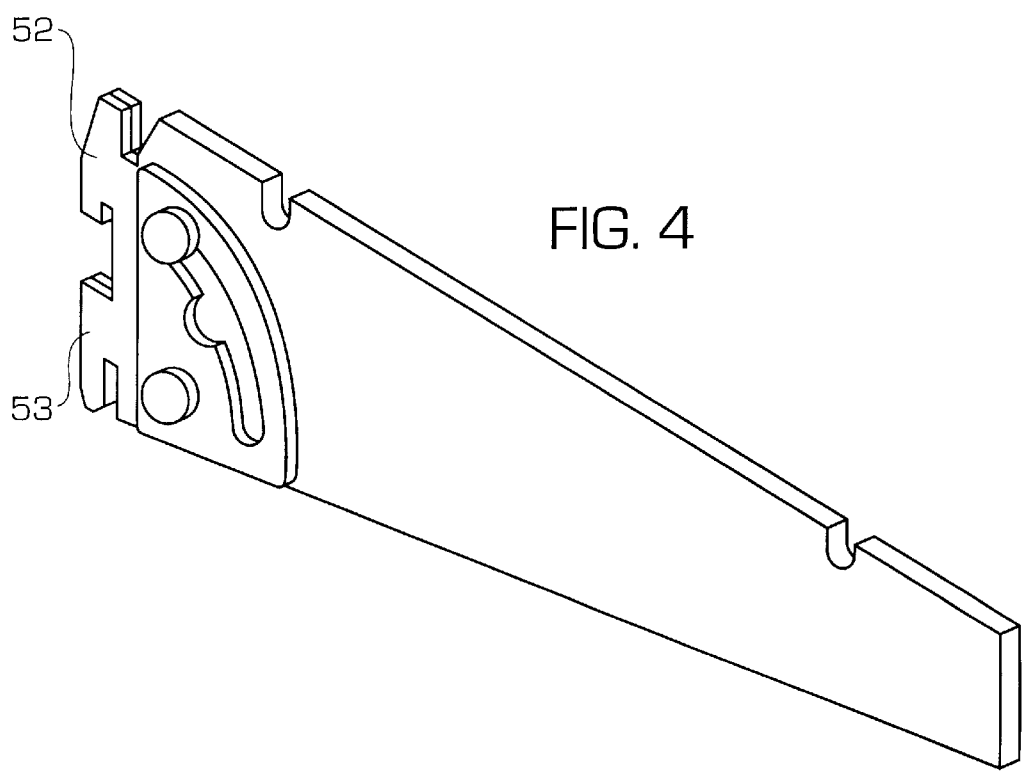

The flat supporting element according to FIG. 4 comprises hooks 52, 53, known per se, which can be introduced into the openings 41, 42, 43, . . . for mounting the flat supporting element with the profiled beam.

The grooves 401, 402, . . . (FIG. 2) are provided as guide grooves and they have the same width and comprise on their left and on their right side walls which are provided pair-wise in two parallel planes.

The distance between the remote, outer edges or ribs 40, 40'. of the outer side walls of two grooves 402, 402' of two adjacent parallel webs 16, 17 is each time preferably smaller than the distance between the outer surfaces of two opposite side walls 3, 5 of the inner tubular part 1, 1'.

Figure 5:
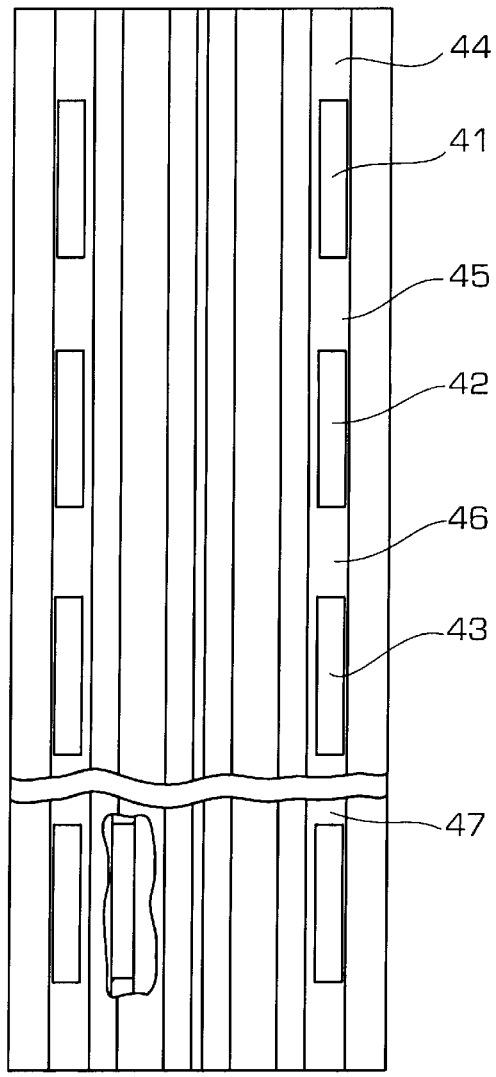
Figure 6:
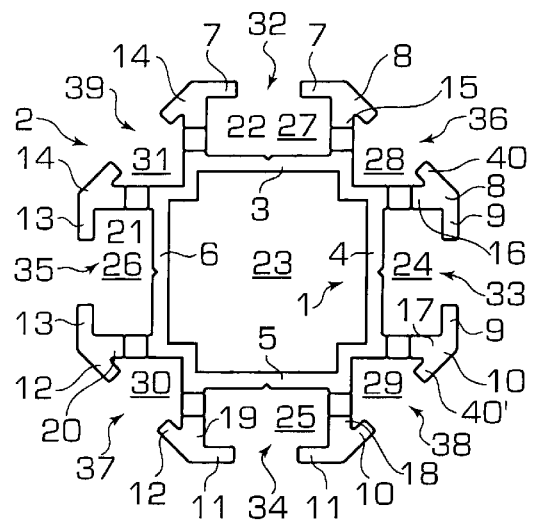

FIGS. 5 and 6 show a profiled beam according to a second embodiment. Identical features in the drawings are indicated by using the same numerals. The profiled beams are composed likewise of an inner tubular part 1 with a substantially quadratic cross section and an outer tubular part 2 with an octagonal cross section.

The webs 15 to 22 are provided, according to FIG. 6, with through-passing slots 41, 42, 43, . . . , which are preferably situated in regular intervals between web walls 44, 45, 46, respectively 47. The width of the long slots 36, 37, 38, and 39, which communicate with the smaller hollow spaces, is sized as large as to allow a plate or a flat supporting element (FIG. 11) to be inserted into one of these long slots, independently of if the plate is parallel to the one or to the other side wall of the inner tube. To this end, the outer rib 40 may, for example, lie in the same plane of the outer surface of side wall 3, or the distance between the edges 40 and 40' may be smaller than the width of the inner tubular part 1 between the outer surfaces of the opposed side walls 3 and 5.

The clamping profile according to FIG. 7 is composed of an inverted U-profile 61 and a flat profile 62, which comprises, in addition to a strip-shaped wall 63, preferably each an angle-shaped lateral longitudinal edge 64, 65. The legs 66, 67 of the U-profile are two parallel elongated walls, provided with an elongated ground plate 68, in such a way that two corner regions 69, 69' are formed. The left corner region 69 of the U-profile is connected to the flat profile 62 by means of an elongated web 70, and the right corner region 69' by means of an elongated web 71. The wall 63, the webs 70 and 71 and the ground plate 68 of the U-profile 61 enclose a hollow space 72. The inner surfaces of these two elongated walls 66, 67 are plane glide-surfaces.

The wall 66 comprises an exterior longitudinal rib 73, which runs parallel to the ground plate 68 and is situated in the region between the end-edge 74 of the wall 66 and the ground plate 68. The end-edge 74 has the shape of an outward-extending wedge 75, which forms an acute, inward directed termination 76 of the wall 66, whereby the other end of the wedge 75 and the rib 73 form an elongated guide-groove 77, whose width corresponds to the thickness of the walls 7, 9, 11 and 13 (FIG. 2 or 6). The wall 67 of the U-profile comprises as well a rib 73' and a wedge 75', which are symmetrically arranged to the corresponding parts of the wall 66.

FIG. 8 shows a clamping profile 60, which is clamped fast in the slot 36 of a beam, whereby, at the corners of the inner tubular part 1, the side walls 3, 4, . . . are preferably inward angular-shaped, in such a way that the angular-shaped strip 101 of the wall 3 appears as a prolongation of the web 15, and the angular-shaped strip 102 of the wall 4 as a prolongation of the web 16.

The clamping profile 60 is made of a hard material, such as hard PVC-plastic, which is, however, elastic enough to permit, by exerting a pressure onto the wall 63, when the wedges 75 touch the outer edges of the beam in the region of the slot 36, a gliding narrowing of the distance between the two walls 66, 67, wherein the clamping profile is pressed into the slot 36 until it remains clamped fast between the ribs 73, 73' and the shoulders of the wedges 75, 75'. The edges 64, 65 of the clamping profile are shaped in such a way that they run, in the mounted state, preferably parallel to the wall 8 or 9, respectively (FIG. 8).

Figure 9:
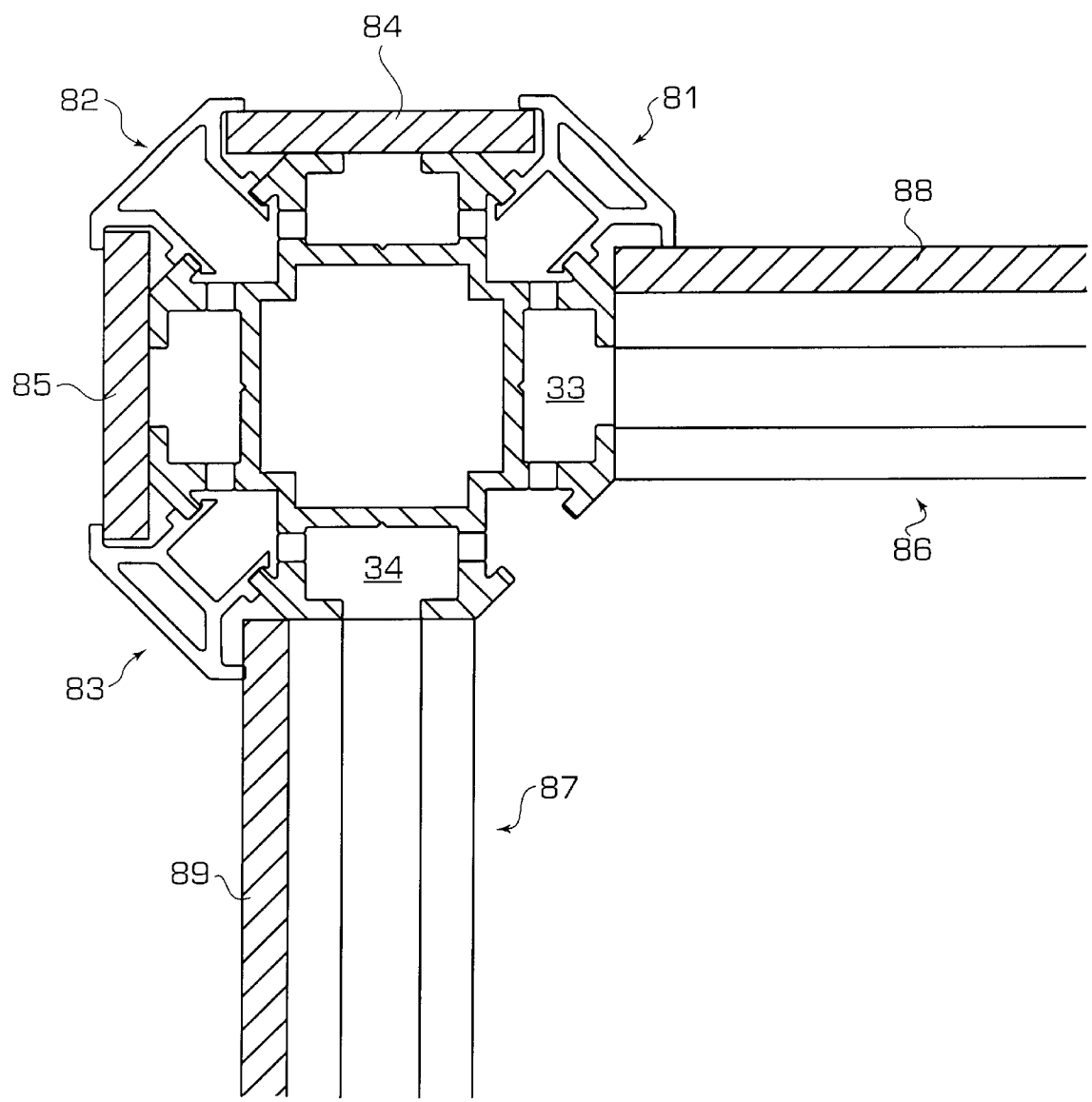

In the example according to FIG. 9, three clamping profiles 81, 82, 83 are clamped, fast in a beam, whereby a first, strip-shaped plate 84 is held between the clamping profiles 81 and 82, and a second, strip-shaped plate 85 between the clamping profiles 82 and 83.

At the slots 33 and 34, each a flat bar 86, respectively 87, is fixed in an in itself known way with the help of clamping elements. As shown in FIG. 9, additional plates 88 and 89 can be held between a flat bar 86, 87 respectively, and a clamping profile 81, 83 respectively.

Figure 10:
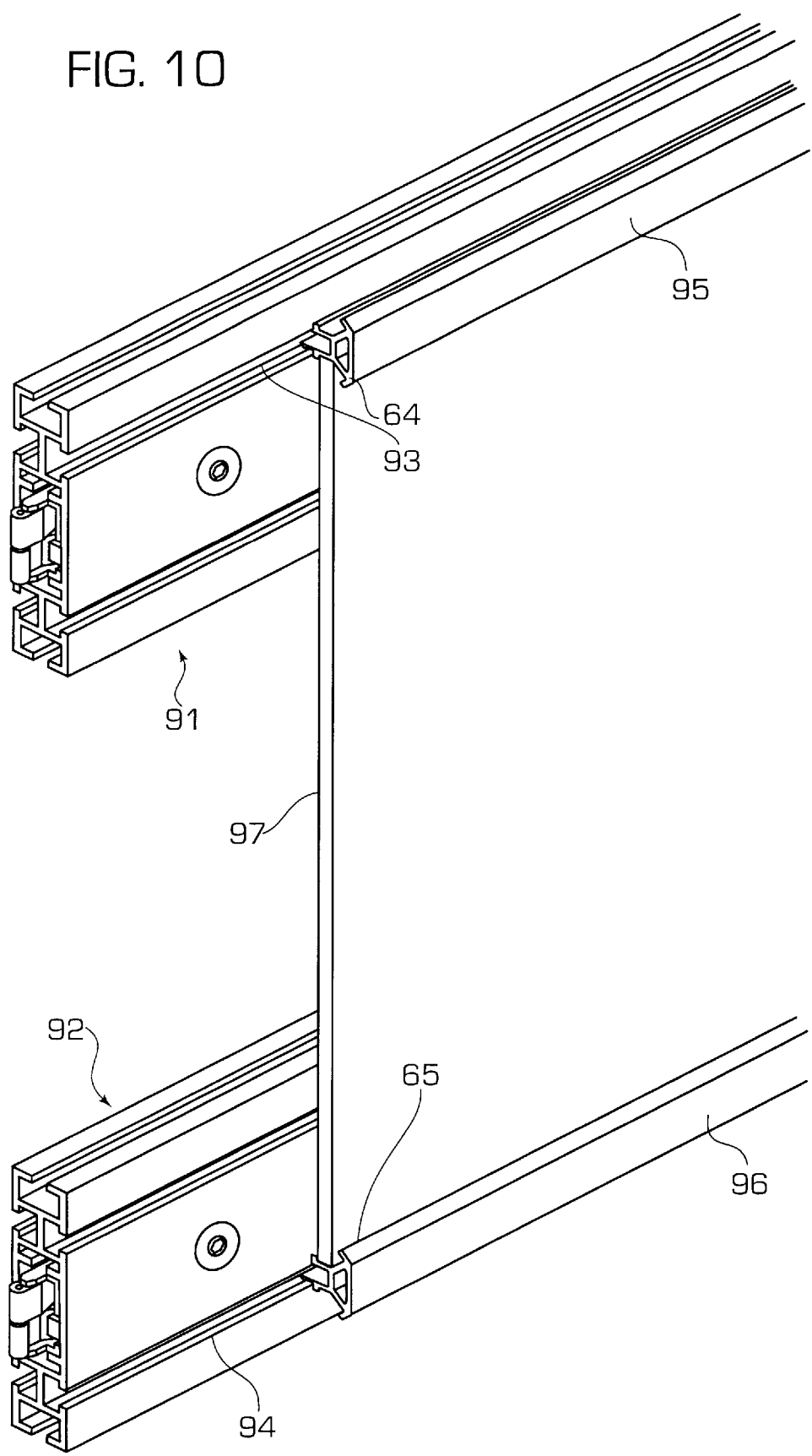

FIG. 10 shows two flat bars 91, 92 in whose end regions a clamping device is lodged, in order to be able to mount them on an not represented supporting beam. The flat bars 91, 92 are provided with at least one long slot 93, 94, in which each a clamping profile 95, 96, according to the invention, is clamped fast. A plate 97, preferably of plastic, glass or another light material, is inserted at one side between the edge 64 of the clamping profile 95 and the flat bar 91, and at the other side between the edge 65 of the clamping profile 96 and the flat bar 92, whereby the end regions of the plate 97 near the clamping profiles 95, 96 lie tightly on the flat bars.

Figure 11:
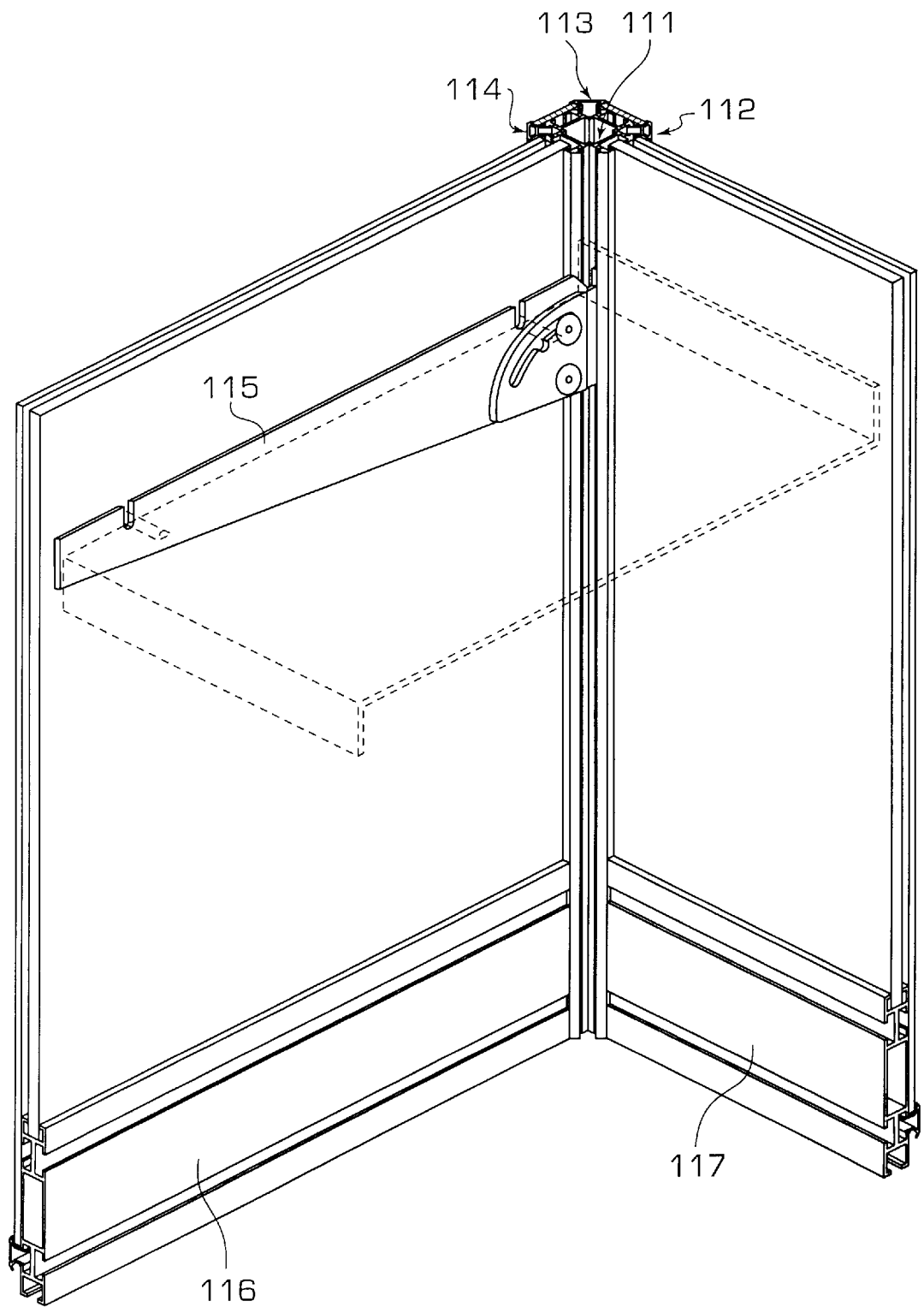

FIG. 11 shows a supporting beam 111, provided with a circular inner tubular part and comprising eight long slots, three of which are covered with each a clamping profile 112, 113, 114. At the supporting side, a supporting element 115 and two flat bars 116, 117 are fixed, which are provided with slots for further clamping profiles. The edges of the clamping profiles serve for the supporting of plates. A supporting surface 118 is attached laterally to the supporting element 115. The supporting element 115, which is oriented parallel to the flat bar 116, can also be mounted at the place of or additionally to this flat bar in parallel orientation to the flat bar 117, which shows the versatile applicability of the profiled beam.

Figure 12:
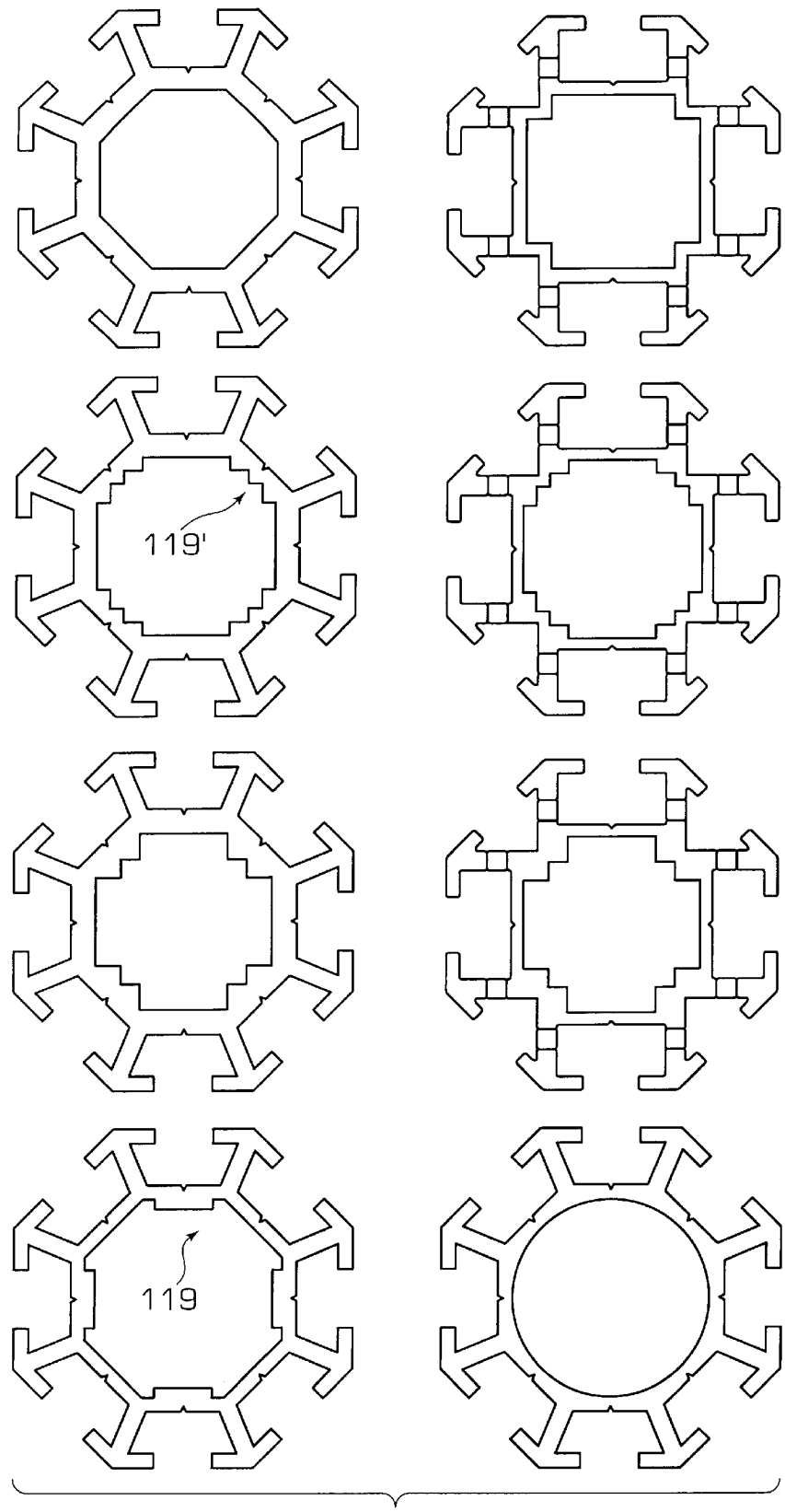

FIG. 12 shows various variants of the cross section of a beam according to the invention, in which the inner tubular part may comprise at the inner side thickenings 119, 119', which are, for example, step-shaped.

Figure 13:
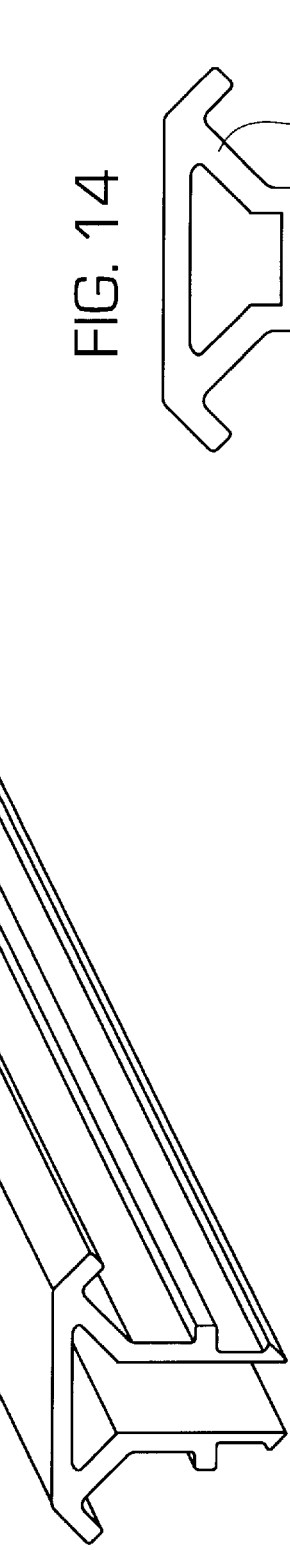

FIG. 13 shows a clamping profile without an additional elongated ground plate or bottom 68 (FIG. 7) and without a hollow space 72, i.e. the bottom 68 may be considered as a part of the auxiliary profile 62. Thereby the lower part of the approximately U-shaped cross-section is laterally outwardly expanded.

Figure 14:
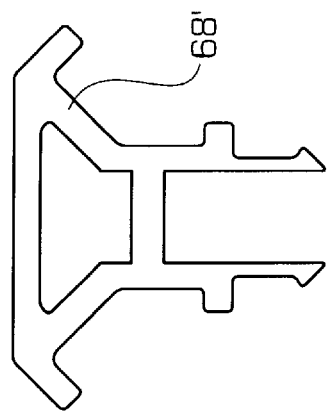

The bottom 68' of the profile of FIG. 14 is not connected to the bend regions 69, 69' but to regions of the walls 66, 67 which are somewhat lower.

Figure 15:
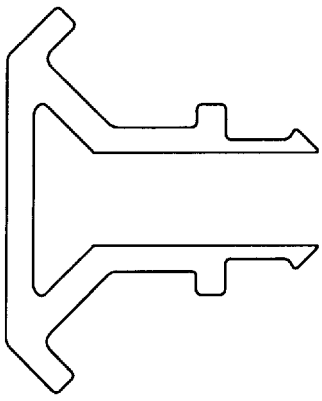

The profile of FIG. 15 has a cross-section like the profile of FIG. 14 but without bottom 68'.

The clamping profile 62 can be shaped as a covering profile for one slot of a beam.

What is claimed is:

1. A structural bar comprising:

an inner tube;

an outer tube connected to said inner tube by web portions, wherein said outer tube has at least two adjacent longitudinal slots extending in a longitudinal direction of said inner and outer tubes and separated by one of said web portions defined as a first web portion; and wherein mounting slots are provided in said first web portion, said mounting slots adapted to secure a flat support element therein; and wherein said mounting slots are aligned in the longitudinal direction of said inner tube parallel to adjacent outer sides of said inner tube.

2. The bar according to claim 1, wherein said fist web portion further comprises a guide groove formed on opposing sides of said first web portion and facing a corresponding one of said longitudinal slots, each of said guide grooves extending in the longitudinal direction of said inner tube; and wherein each of said guide grooves has two side walls lying in respective parallel planes such that one of said two side walls for one guide groove lies in a same parallel plane as a corresponding side wall for said other guide groove formed on the opposing side of said first web portion, and the other of said two side walls for said one guide groove lies in the same plane as a corresponding side wall for said other guide groove formed on the opposing side of said first web portion.

3. The bar according to claim 1, wherein said inner tube has a square cross-section with four side walls and said outer tube has an octagonal cross-section with eight side walls, such that four side walls of said outer tube run parallel to four side walls of said inner tube;

where in each of said four side walls of said outer tube that run parallel to four side walls of said inner tube has a central longitudinal slot, wherein one of said central longitudinal slots of said four side walls of said outer tube is one of said at least two adjacent longitudinal slots extending in a longitudinal direction of said inner and outer tubes;

wherein said bar comprises eight web portions, including said first web portion, connecting said outer tube to said inner tube, said eight web portions extending outwardly and perpendicularly in pairs from corresponding corner regions of said side walls of said inner tube, and wherein each web portion is connected to a corresponding junction region of two adjacent side walls of the octagonal tube part;

wherein two further side walls of said outer tube run parallel to one diagonal of the square cross-section of said inner tube, each of said two further side walls having a central longitudinal slot, wherein one of said central longitudinal slots of said two further side walls of said outer tube is the other of said at least two adjacent longitudinal slots extending in a longitudinal direction of said inner and outer tubes; and wherein said remaining two side walls of said outer tube run parallel to the other diagonal of the square cross-section of said inner tube, each of said remaining two side walls having a central longitudinal slot.

4. The bar according to claim 1, wherein said mounting slots in said first web portion are spaced at regular intervals by web walls in said first web portion.

5. The bar according to claim 3, wherein a width of each of said longitudinal slots of said side walls running parallel to the diagonals of the square cross-section of said inner tube is adapted to receive a flat support element therein when the flat support element is inserted into said longitudinal slot parallel to either adjacent side wall of said inner tube.

6. The bar according to claim 1 further comprising a clamp attachable to said bar, said clamp comprising:

a substantially U-shaped portion; and an auxiliary portion attached to said U-shaped portion;

wherein said U-shaped portion comprises two elongate walls extending from an elongated base; and wherein at least one of said two elongated walls has a tapered edge at its distal end such that a width of said distal end increases in a direction from said distal end towards said elongated base, and terminates at a shoulder portion of said tapered edge.

7. The bar according to claim 6, wherein said at least one of said two elongated walls having said tapered edge includes an outer longitudinal rib running parallel to said elongated base and disposed between said shoulder portion of said tapered edged and said elongated base.

8. The bar according to claim 6, wherein each of said two elongated walls extending from said elongated base has a tapered edge at its distal end such that a width of said distal end increases in a direction from said distal end towards said elongated base, and terminates at a shoulder portion of said tapered edge;

wherein each of said two elongated walls extending from said elongated base includes an outer longitudinal rib running parallel to said elongated base and disposed between said shoulder portion of said tapered edged and said elongated base; and wherein said tapered edges and said longitudinal ribs are arranged symmetrically with respect to a plane of symmetry running between said elongated walls extending from said elongated base.

9. The bar according to claim 6, wherein said auxiliary portion has a flat portion including a strip-shaped longitudinal wall portion and at least one angled portion extending at an angle from said strip-shaped wall, said angled portion adapted to receive and support a panel.

10. The bar according to claim 6, wherein said U-shaped portion is connected to said auxiliary portion by two elongated webs extending from respective corner regions of said U-shaped portion, each of said elongated webs forming an angle with respect to a corresponding one of said elongate walls extending from an elongated base.

11. The bar according to claim 1, wherein said mounting slots are through holes in said first web portion.

12. The bar according to claim 1, wherein mounting slots are provided in each web portion, said mounting slots adapted to secure a flat support element therein; and wherein said mounting slots are aligned in the longitudinal direction of said inner tube, parallel to adjacent outer sides of said inner tube.

13. The bar according to claim 1, wherein said an inner tube has a square cross-section, said outer tube has an octagonal cross-section, and said outer tube has longitudinal slots formed in each of the eight sides of said outer tube and extending in a longitudinal direction of said inner and outer tubes, and wherein each adjacent pair of said longitudinal slots is separated by one of said web portions.

* * * * *